(12) United States Patent
Yasuda et al.

(10) Patent No.: US 7,843,778 B2
(45) Date of Patent: Nov. 30, 2010

(54) OPTICAL DISC APPARATUS AND CONTROL METHOD INCLUDING AN EXCESS DETECTION MODE

(75) Inventors: Ryohei Yasuda, Kanagawa (JP); Takafumi Arai, Kanagawa (JP); Yukihiko Okada, Tokyo (JP)

(73) Assignee: Sony Corporation, Tokyo (JP)

( * ) Notice: Subject to any disclaimer, the term of this patent is extended or adjusted under 35 U.S.C. 154(b) by 1233 days.

(21) Appl. No.: 11/435,145

(22) Filed: May 16, 2006

(65) Prior Publication Data
US 2006/0277559 A1    Dec. 7, 2006

(30) Foreign Application Priority Data
May 20, 2005    (JP)    ............................. 2005-148736

(51) Int. Cl.
*G11B 7/00*    (2006.01)
(52) U.S. Cl. ................ 369/44.32; 369/44.27; 369/44.33
(58) Field of Classification Search .............. 369/44.32, 369/44.33, 44.27
See application file for complete search history.

(56) References Cited
U.S. PATENT DOCUMENTS 5,184,337 A * 2/1993 Rokutan ................... 369/44.25
5,519,681 A * 5/1996 Maeda et al. ............. 369/47.16
6,834,030 B2 * 12/2004 Kishimoto et al. ........ 369/44.32

* cited by examiner

*Primary Examiner*—Wayne R Young
*Assistant Examiner*—Latanya Bibbins
(74) *Attorney, Agent, or Firm*—Wolf, Greenfield & Sacks, P.C.

(57) ABSTRACT

An optical disc apparatus includes: a section for controlling an actuator by generating a voltage indication value indicative of a drive voltage applied to the actuator driving an objective lens; an section for periodically detecting the voltage indication value; a section for going into an excess detection mode when the voltage indication value outside a tolerable range is detected, and starting a re-detection period when the voltage indication value inside the tolerable range is detected, and remaining in the excess detection mode and extending the re-detection period when the voltage indication value outside the tolerable range is detected during the re-detection period, and stopping the excess detection mode when the voltage indication value outside the tolerable range is not detected again during the re-detection period; and an section for limiting the voltage indication value when staying in the excess detection mode for longer than a fail-safe action start period.

4 Claims, 5 Drawing Sheets

OPTICAL DISC APPARATUS AND CONTROL METHOD INCLUDING AN EXCESS DETECTION MODE

CROSS REFERENCES TO RELATED APPLICATIONS

The present invention contains subject matter related to Japanese Patent Application JP2005-148736 filed in the Japanese Patent Office on May 20, 2005, the entire contents of which being incorporated herein by reference.

BACKGROUND OF THE INVENTION

1. Field of the Invention

The preset invention relates to an optical disc apparatus and control method, and is preferably applied to an optical disc device capable of reproducing and recording on an optical disc, for example.

2. Description of Related Art

Generally, an optical disc device has an optical pickup which allows a laser beam to follow and focus on a target track on an optical disc by activating an actuator and moving an objective lens (see Jpn. Pat. Laid-open publication No. H02-103738, for example).

SUMMARY OF THE INVENTION

By the way, in a case in which the above-noted optical disc device is exposed to a vibration or impact; or the optical disc device utilizes a storage medium with characteristic defects such as mechanical deformation or deflection, a target track on a rotating optical disc may not be stabilized. In this case, the optical disc device keeps swinging the actuator so that the objective lens follows the target track, and therefore an actuator coil is being exposed to a high voltage for a long time. This may possibly heat up and burn out the actuator coil.

Therefore, the optical disc device is equipped with a fail-safe circuit that limits the amount of current flowing through the actuator coil to a prescribed level to prevent the actuator coil from being burned out. But installing the fail-safe circuit in the optical disc device which already has an essential drive circuit increases the complexity of the optical disc device.

The present invention has been made in view of the above points and is intended to provide an optical disc apparatus and control method capable of protecting an actuator without being complex.

In an embodiment of the present invention, an optical disc apparatus includes: a drive control section for controlling an actuator by generating a voltage indication value indicative of a drive voltage applied to the actuator, the actuator driving an objective lens; an indication value detection section for periodically detecting the voltage indication value; a mode determination section for going into an excess detection mode when the voltage indication value outside a predetermined tolerable range is detected, and then for starting a re-detection period when the voltage indication value inside the tolerable range is detected, and then for remaining in the excess detection mode and extending the re-detection period when the voltage indication value outside the tolerable range is detected again during the re-detection period, and then for stopping the excess detection mode when the voltage indication value outside the tolerable range is not detected again during the re-detection period; and an indication value limitation section for limiting the voltage indication value when staying in the excess detection mode for longer than a predetermined fail-safe action start period.

That prevents excess voltage from being applied to an actuator coil for a long time, and therefore there is no need to have fail-safe circuits. Thus, the optical disc apparatus can protect the actuator without being complex.

In addition, in an embodiment of the present invention, a control method of an optical disc apparatus includes: an indication value detection step of periodically detecting a voltage indication value indicative of a drive voltage applied to an actuator, the actuator driving an objective lens; an excess detection mode start step of going into an excess detection mode when the voltage indication value outside a predetermined tolerable range is detected; a re-detection period start step of starting a re-detection period when the voltage indication value inside the tolerable range is detected during the excess detection mode; a mode determination step of remaining in the excess detection mode and extending the re-detection period when the voltage indication value outside the tolerable range is detected again during the re-detection period, and then stopping the excess detection mode when the voltage indication value outside the tolerable range is not detected again during the re-detection period; and an indication value limitation step of limiting the voltage indication value when staying in the excess detection mode for longer than a predetermined fail-safe action start period.

That prevents excess voltage from being applied to an actuator coil for a long time, and therefore there is no need to have fail-safe circuits. Thus, the control method of the optical disc apparatus can protect the actuator without being complex.

The optical disc apparatus and control method according to an embodiment of the present invention prevent excess voltage from being applied to an actuator coil for a long time, and therefore there is no need to have fail-safe circuits. Thus, the optical disc apparatus and control method can protect the actuator without being complex.

The nature, principle and utility of the invention will become more apparent from the following detailed description when read in conjunction with the accompanying drawings in which like parts are designate by like reference numerals or characters.

DETAILED DESCRIPTION OF PREFERRED EMBODIMENTS

An embodiment of the present invention will be described in detail with reference to the accompanying drawings.

(1) Overall Configuration of Optical Disc Device

Figure 1:
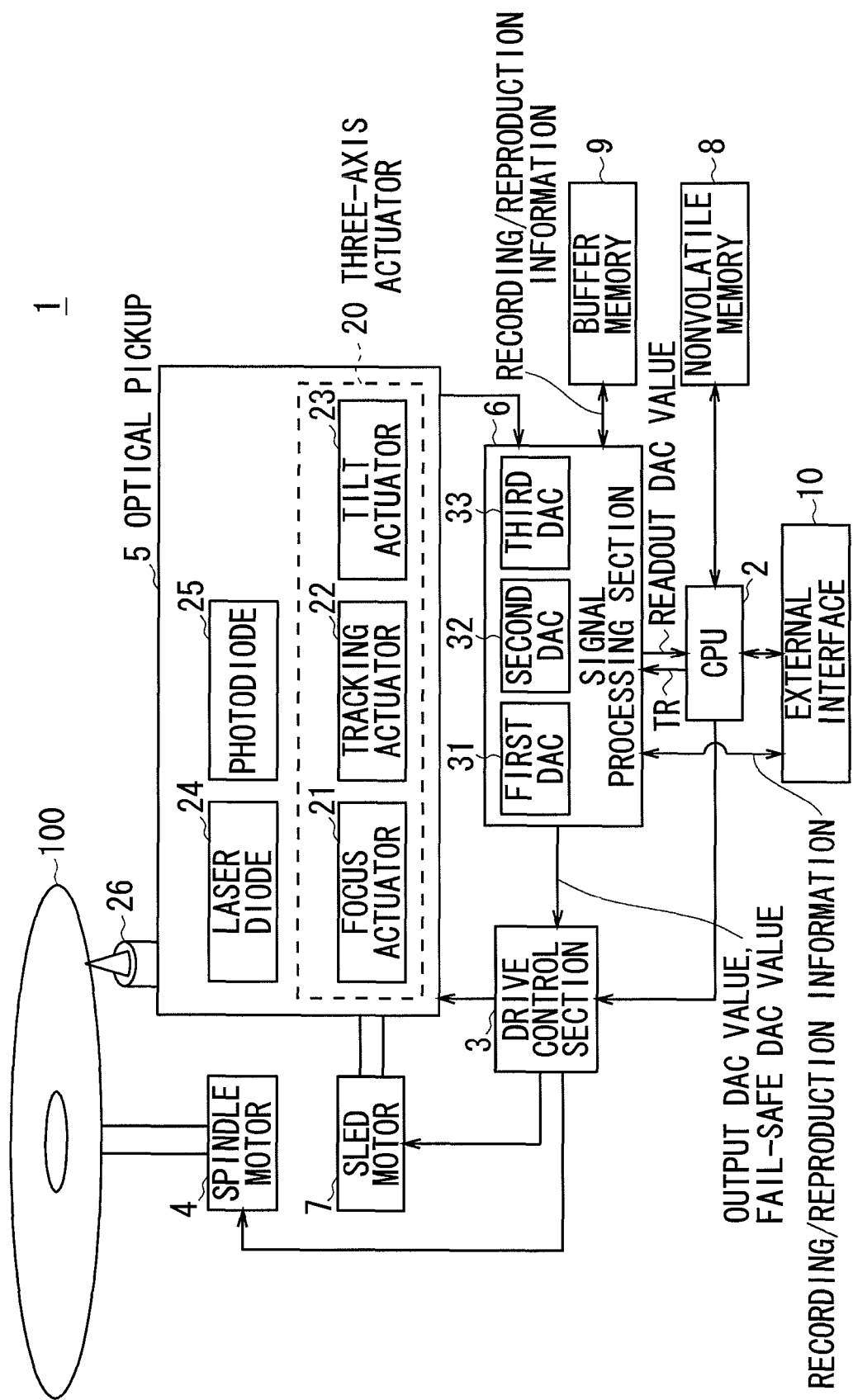
FIG. 1 is a schematic block diagram showing the circuit configuration of an optical disc device.

In FIG. 1, the reference numeral 1 represents an optical disc device as a whole, which is equivalent to an information reproduction apparatus. A Central Processing Unit (CPU) 2 takes overall control of the optical disc device 1.

An optical disc 100 is placed on a turntable (not shown), and is rotated by a spindle motor 4 (which is equivalent to drive means) when reproducing and recording data on the optical disc 100. An optical pickup 5 is utilized to read out data stored in the optical disc 100.

The optical pickup 5 includes a laser diode 24, which is a source of laser beam; a photodiode 25, which detects reflected light; a three-axis actuator 20, which holds an objective lens 26 (The objective lens 26 is an output terminal for a laser beam); and an optical system (not shown), which emits a laser beam to a recording surface of the disk through the objective lens 26 and then leads the reflection to the photodiode 25.

The three-axis actuator 20 includes a focus actuator 21, which moves the objective lens 26 in a direction of an optical axis (This direction will be referred to as a focus direction); a tracking actuator 22, which moves the objective lens 26 in a radial direction of the optical disc 100 (This direction will be referred to as a tracking direction); and a tilt actuator 23, which adjusts the degree of tilt of the objective lens 26 with respect to the optical disc 100.

The photodiode 25 receives reflections from the optical disc 100 and performs photoelectric conversion to the reflections to generate a reception light signal in accordance with the amount of received light. The photodiode 25 then supplies the reception light signal to a signal processing section 6. The signal processing section 6 generates reproduction information, which is obtained by decoding the reception light signal; a focus error signal indicative of the deviation between the current position of the objective lens 26 and a focus position in the focus direction; a tracking error signal indicative of the deviation between the current position of the objective lens 26 and a target track in the tracking direction; and a tilt error signal indicative of the deviation of the tilt of the optical axis of laser beam.

The signal processing section 6 supplies the reproduction information to an external host machine (not shown) via an external interface 10 while temporarily storing the reproduction information in a buffer memory 9 (The external host machine is for example equivalent to a personal computer).

Based on the focus error signal, a first Digital Analog Converter (DAC) 31 of the signal processing section 6 generates a focus DAC value indicative of the level of voltage to be supplied to the focus actuator 21, and then supplies the focus DAC value to a drive control section 3. To move the objective lens 26 to the focus position, the drive control section 3 activates the focus actuator 21 by applying a drive voltage corresponding to the focus DAC value.

Based on the tracking error signal, a second DAC 32 of the signal processing section 6 generates a tracking DAC value indicative of the level of voltage to be supplied to the tracking actuator 22, and then supplies the tracking DAC value to the drive control section 3. To move the objective lens 26 to a central position of the track, the drive control section 3 activates the tracking actuator 21 by applying a drive voltage corresponding to the tracking DAC value. When the signal processing section 6 moves the objective lens 26 a long distance in the tracking direction, the signal processing section 6 controls the drive control section 3 to activate a sled motor 7 which then moves the whole optical pickup 5 to move the objective lens 26 to a prescribed track position.

Similarly, based on the tilt error signal, a third DAC 33 of the signal processing section 6 generates a tilt DAC value indicative of the level of voltage to be supplied to the tilt actuator 23, and then supplies the tilt DAC value to the drive control section 3. To tilt the objective lens 26 such that an optical axis of the laser beam emitted from the objective lens 26 is perpendicular to the optical disc 100, the drive control section 3 activates the tilt actuator 23 by applying a drive voltage corresponding to the tilt DAC value.

(2) Fail-Safe Process for Actuators

In the optical disk device 1 with the above configuration, the CPU 2 performs fail-safe process for the three-axis actuator 20. This fail-safe process is performed separately for each actuator (the focus actuator 21, the tracking actuator 22 and the tilt actuator 23). For ease of explanation, only the fail-safe process for the focus actuator 21 will be described below.

(2-1) DAC Value Monitoring by CPU

The signal processing section 6 generates the focus DAC value (referred to as an output focus DAC value) at certain intervals (equivalent to a generation cycle). In contrast, the CPU 2 reads out the focus DAC value from the signal processing section 6 at certain intervals (equivalent to an acquisition cycle, which is slower than the cycle of generation), and monitors whether this focus DAC value (referred to as a readout focus DAC value) is within a prescribed normal output range. By the way, in the present embodiment, when the focus DAC value is less than a plus threshold value and is greater than a minus threshold value, this focus DAC value is within the normal output range; otherwise, the focus DAC value is outside of the normal output range.

Figure 2:
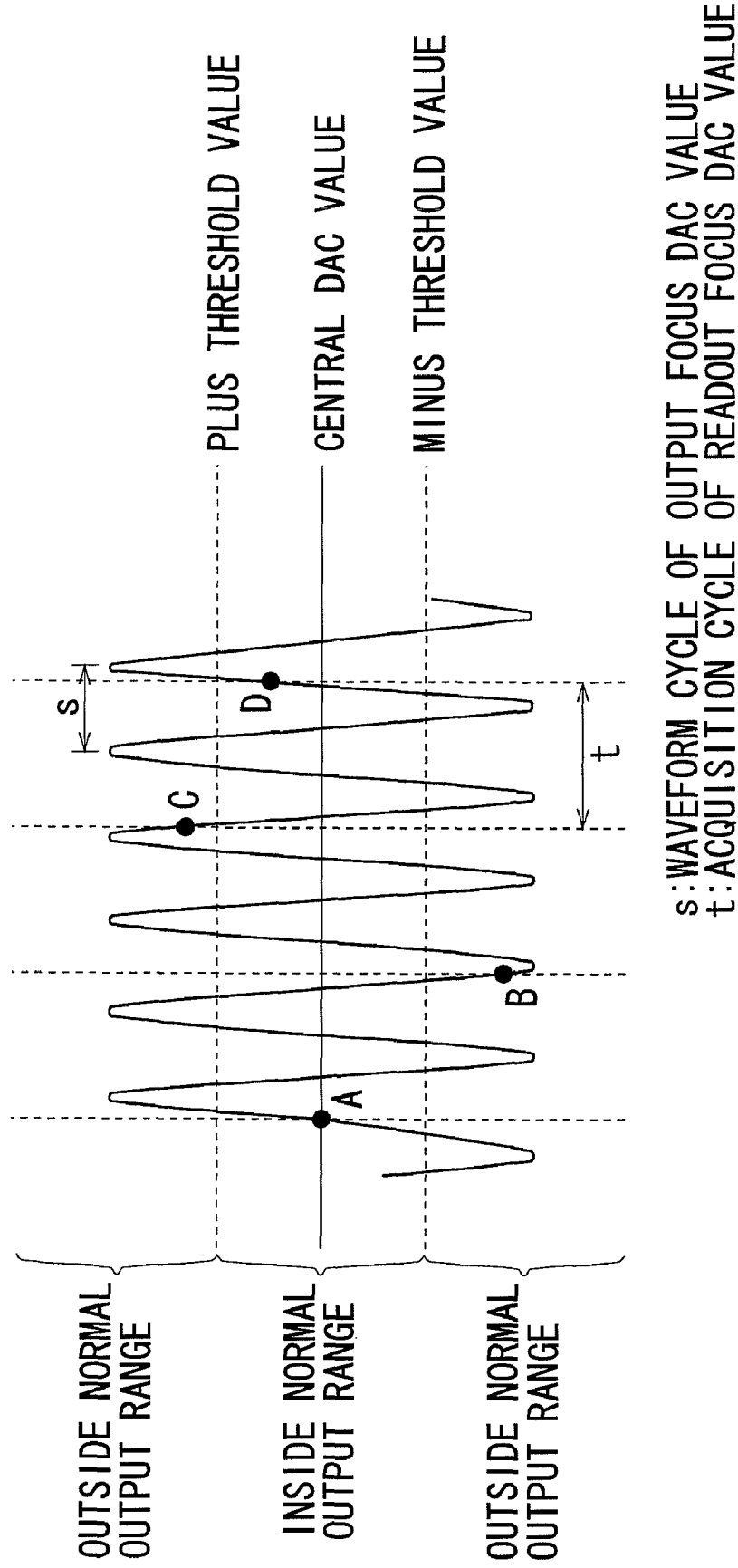
FIG. 2 is a schematic diagram illustrating an acquisition cycle of readout focus DAC value.

As shown in FIG. 2, the wave of the output focus DAC value goes up and down with respect to a central DAC value which is a criterion, and its amplitude and waveform cycle vary depending on various conditions, such as the characteristics of the disc and setting for reproduction. Therefore, the waveform cycle of the output focus DAC value can hardly be equal to the acquisition cycle of the readout focus DAC value. In the case of FIG. 2, the acquisition cycle t of the readout focus DAC value is approximately 1.8 times as large as the waveform cycle s of the output focus DAC value. In this manner, even if the amplitude of the output focus DAC value is outside the normal output range, the readout focus DAC value, which is acquired by the CPU 2, is inside the normal output range at time instants A and D.

Consequently, when the CPU 2 detects that the readout focus DAC value goes outside the normal output range, the CPU 2 in a normal monitoring mode goes into an excess detection mode in which there is a possibility that the amplitude of the output focus DAC value is outside the normal output range. In the excess detection mode, when the CPU 2 detects again the readout focus DAC value outside the normal output range (This readout focus DAC value will be referred to as an outside readout DAC value), the CPU 2 extends the period of the excess detection mode; when the CPU 2 acquires the readout focus DAC value inside the normal output range (This readout focus DAC value will be referred to as an inside readout DAC value), the CPU 2 remains in the excess detection mode and starts to count the number of continuous acquisition of the inside readout DAC value.

In the above-noted excess detection mode, when the CPU 2 acquires again the outside readout DAC value before the number of continuous acquisition of the inside readout DAC value reaches a predetermined number which is a condition to stop the excess detection mode (This condition will be also referred to as an excess detection mode stop condition), the CPU 2 resets the number of acquisition of the inside readout DAC value to "0," and extends the period of the excess detection mode. In contrast, the CPU 2 detects that the number of continuous acquisition of the inside readout DAC value meats the excess detection mode stop condition before detecting the outside readout DAC value, the CPU 2 stops the excess detection mode and then returns to the normal monitoring mode.

Figure 3:
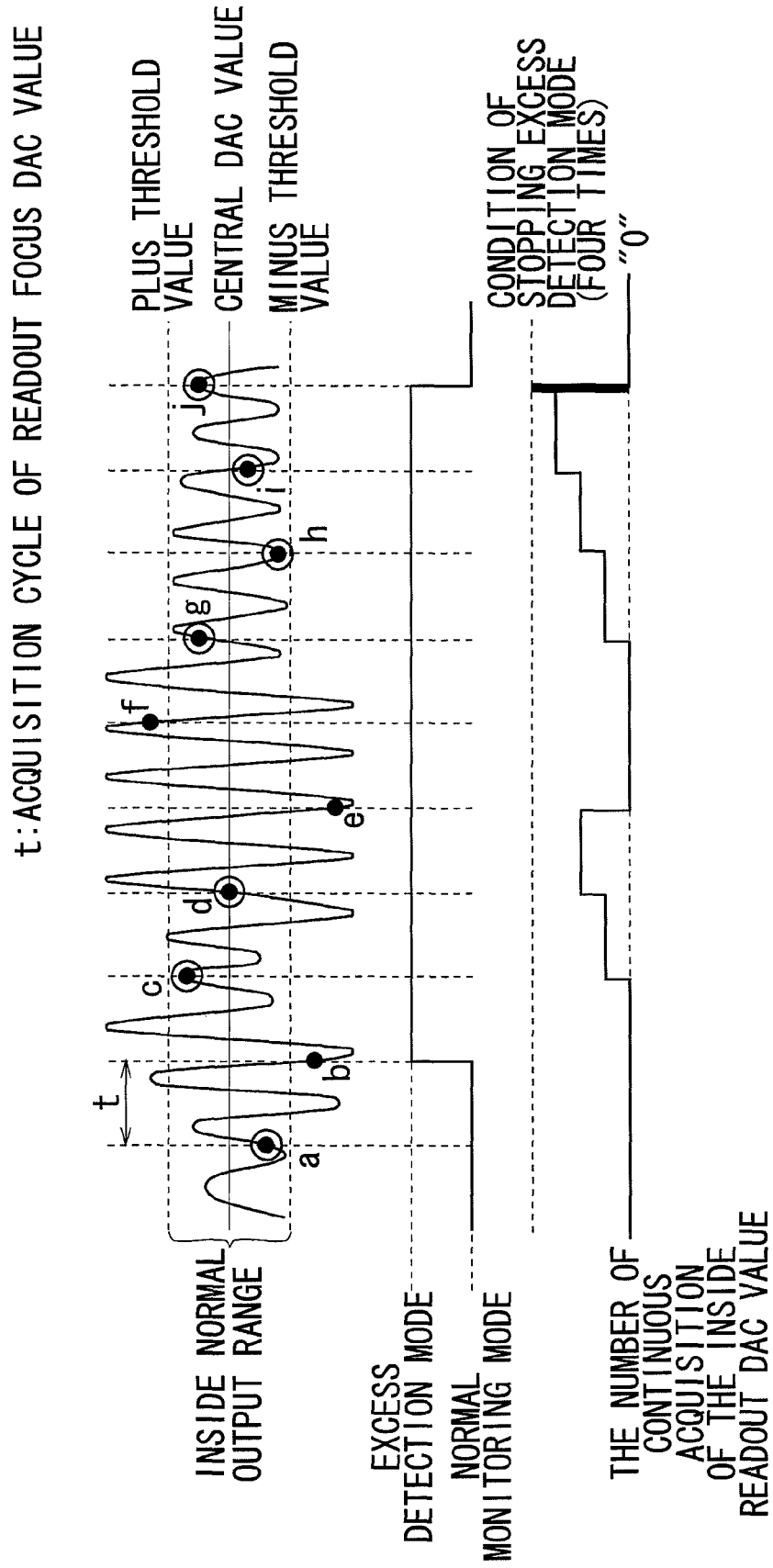
FIG. 3 is a schematic diagram illustrating an excess detection mode and normal monitoring mode of a CPU.

As shown in FIG. 3, the CPU 2, which is currently in the normal monitoring mode at time instance a, goes into the excess detection mode when the CPU 2 detects the outside readout DAC value at time instance b. After that, the CPU 2 acquires the inside readout DAC value at time instances c and d and thereby makes the number of continuous acquisition of the inside readout DAC value "2." And then when the CPU 2 acquires again the outside readout DAC value at time instance e, the CPU 2 resets the number of continuous acquisition to "0" and extends the period of the excess detection mode. After that, when the CPU 2 detects the outside readout DAC value at time instance f and then meats the excess detection mode stop condition by acquiring the inside readout DAC value for the fourth time in a row during the period of time g to h, the CPU 2 stops the excess detection mode and returns to the normal monitoring mode.

In this manner, if once the CPU 2 detects the outside readout DAC value, the CPU 2 goes into the excess detection mode, and remains in the excess detection mode until it meats the excess detection mode stop condition. Therefore, the CPU 2 detects the outside readout DAC value without fail during the excess detection mode, and then recognizes that the amplitude of the output DAC value is outside the normal output range. Thus, the CPU 2 can certainly detect that the amplitude of the output focus DAC value is outside the normal output range, even if the CPU 2 monitors the readout focus DAC value in accordance with the acquisition cycle, which is slower than the generation cycle of the output focus DAC value by the signal processing section 6.

Figure 4:
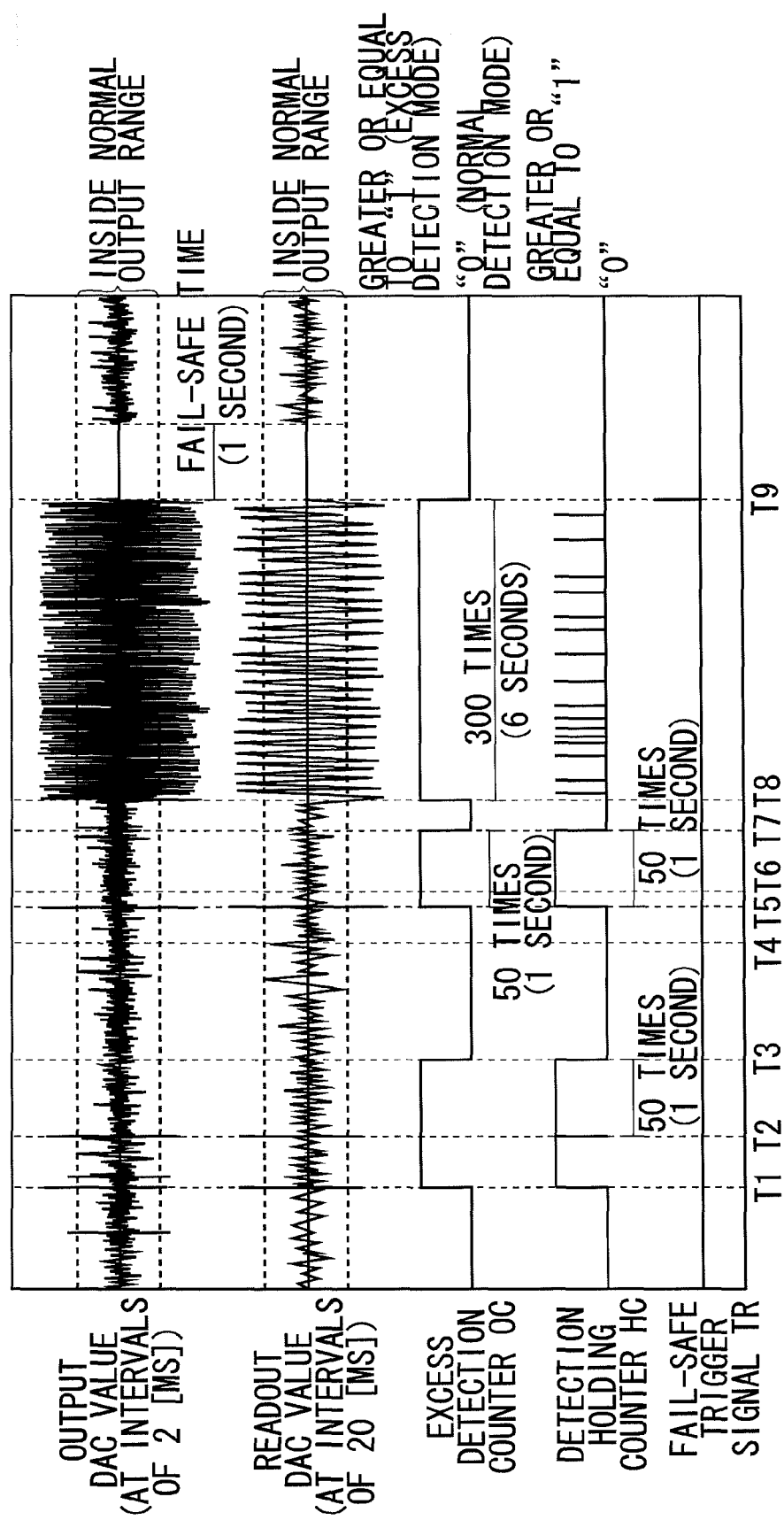
FIG. 4 is a schematic diagram illustrating safe-fail process for actuators.

For example, the signal processing section 6, as shown in FIG. 4, actually generates the output focus DAC value at intervals of 2 ms, and then supplies them to the drive control section 3. On the other hand, the CPU 2 acquires the readout focus DAC value from the signal processing section 6 at intervals of 20 ms. The CPU 2 in the excess detection mode controls an excess detection counter OC to count the number of continuous acquisition of the readout DAC value, and also controls a detection holding counter HC to count the number of continuous acquisition of the inside readout DAC value. When the CPU 2 in the normal monitoring mode acquires the inside readout DAC value, the counting is not performed, and thereby the excess detection counter OC and the detection holding counter HC hold "0."

When the CPU 2 acquires the outside readout DAC value at time instance T1, the CPU 2 then goes into the excess detection mode after adding "1" to the value of the excess detection counter OC. In this excess detection mode, when the CPU 2 subsequently acquires the inside readout DAC value, the CPU 2 then adds "1" to the value of the excess detection counter OC and also adds "1" to the value of the detection holding counter HC. After that, when the CPU 2 detects the outside readout DAC value again, the CPU 2 then extends the period of the excess detection mode.

That is to say, when the CPU 2 in the excess detection mode acquires the outside readout DAC value again at time instance T2, the CPU 2 adds "1" to the value of the excess detection counter OC and resets the value of the detection holding counter HC to "0", and then extends the period of the excess detection mode. When the CPU 2 subsequently acquires the inside readout DAC value, the CPU 2 then adds "1" to the value of the excess detection counter OC and also restarts the counting of the detection holding counter HC by adding "1" thereto.

After that, when the CPU 2 in the excess detection mode acquires the outside readout DAC value again, the CPU 2 increases the value of the detection holding counter HC; when the value of the detection holding counter HC meats the condition of stopping the excess detection mode, the CPU 2 then stops the excess detection mode. That is to say, the CPU 2 increases the value of the detection holding counter HC during the period of time T2 to T3, because the outside readout DAC value is not detected by the CPU 2. After that, when the value of the detection holding counter HC reaches 50 (i.e. the value of the detection holding counter HC meats the condition of stopping the excess detection mode) after the CPU 2 acquires the inside readout DAC value at time instance T3, the CPU 2 then resets the value of the detection holding counter HC and excess detection counter OC to "0" and stops the excess detection mode, and thereby returning to the normal monitoring mode.

(2-2) Fail-Safe Action for Actuators

The value of the excess detection counter OC, which represents the number of acquisition of the readout focus DAC value in the excess detection mode, may increase to a predetermined number which is a condition of starting fail-safe action for the actuator 21 (This condition will be also referred to as a fail-safe action start condition). Meeting this condition means that the excess detection mode continues for a long time and that there is a possibility an actuator coil of the actuator 21 has been exposed to a high voltage for a long time; therefore, the CPU 2 starts the fail-safe process for the actuator 21.

The CPU 2 goes into the excess detection mode after detecting the outside readout DAC value at time instance T8; then the count value of the excess detection counter OC in the excess detection mode meats the fail-safe action start condition (i.e. the count value of the excess detection counter OC reaches 300) at time instance T9 as a result of detecting the outside readout DAC value intermittently; and therefore the CPU 2 generates a fail-safe trigger signal TR and supplies the fail-safe trigger signal TR to the signal processing section 6 (FIG. 1).

When the signal processing section 6 receives the fail-safe trigger signal TR, the signal processing section 6 then starts to control the first DAC 31 to generate a focus DAC value (referred to as a fail-safe focus DAC value) which is equal to the central DAC value (0 V, for example); then the signal processing section 6 supplies the fail-safe focus DAC value to the drive control section 3 during a certain period of time (i.e. fail-safe time: 1 second).

Based on the fail-safe focus DAC value, the drive control section 3, as shown in FIG. 4, stops applying voltages to the focus actuator 21 for 1 second (during the fail-safe time) to cool the actuator coil. This prevents excess voltage from being applied to the actuator coil for a long time, and therefore protects the actuator coil from heating up and being burned out.

During this time (during the fail-safe time), the CPU 2 keeps reproducing the information of the optical disc 100 without fault by reading out the reproduction information from the buffer memory 9 (FIG. 1). At this time, the CPU 2 may supply information about fail-safe process to the host machine via the external interface 10. Therefore, the CPU 2 can inform users through the host machine that the fail-safe process is performed.

In addition, the CPU 2 saves history information in a non-volatile memory 8 when the CPU 2 starts the fail-safe process. This allows the CPU 2 to provide users with the history information about fail-safe process; therefore, the user can utilize the history information for example when the optical disc device 1 breaks down.

In this case, the CPU 2 can set various conditions, such as the threshold values limiting the range of the normal output of the focus DAC value, the condition of stopping the excess detection mode, and the condition of starting the fail-safe process. Therefore, even if the design of the focus actuator 21 and peripheral units is changed, the optical disc device 1 can perform the fail-safe process of actuator just by adjusting the settings of the above conditions. This increases the flexibility of the design, compared to the general focus actuators equipped with special fail-safe circuits.

When the readout focus DAC value is outside the normal output range for a long time the CPU 2 starts the fail-safe process, whereas when the readout focus DAC value is outside the normal output range just for a very short time the CPU 2 does not start the fail-safe process; therefore the CPU 2 can move the focus actuator 21 a large distance by instantaneously applying a high voltage. This allows the optical disc device 1 to move the focus actuator faster compared to an optical disc device equipped with a fail-safe circuit which only prevents excess voltage from being applied.

In this manner, in the case in which a high voltage, which is outside the normal output range, has been applied to the focus actuator 21 for a long time, the CPU 2 sets the output focus DAC value to 0 V to stop the output of the focus actuator 21 for one second and to cool the actuator coil. This reduces heat generation in the actuator coil, and thereby preventing the actuator coil from being burned out.

(3) Fail-Safe Process for Actuators

Figure 5:
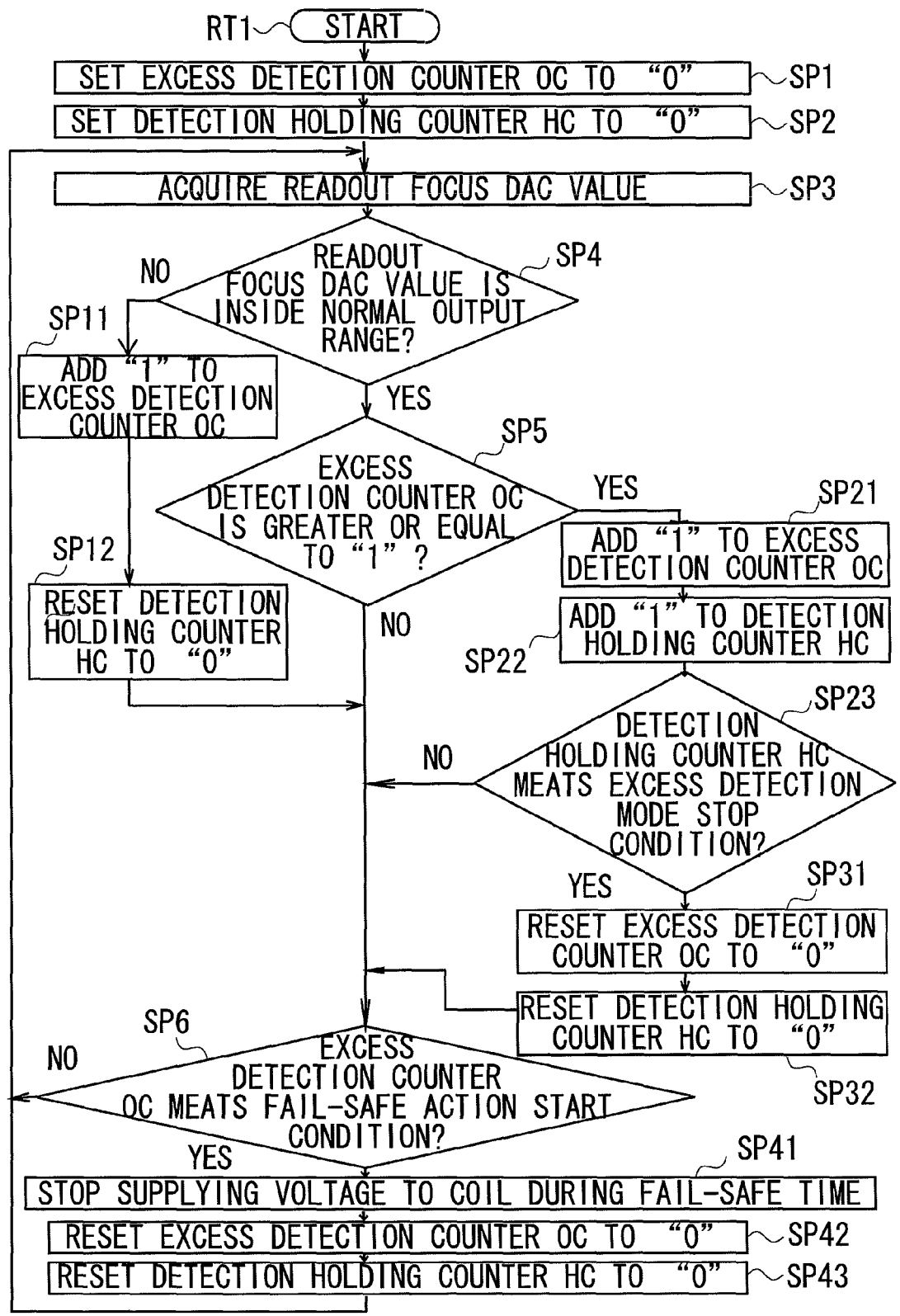
FIG. 5 is a flowchart showing the fail-safe process for actuators.

With reference to FIGS. 4 and 5, the fail-safe process for actuators by the optical disc device 1 will be described below.

The CPU 2 of the optical disc device 1 starts the procedure RT of the fail-safe process of actuators from start step, and then proceeds to step SP1. The CPU 2 of the optical disc device 1 at step SP1 sets the value of the excess detection counter OC, which represents the number of acquisition of the readout focus DAC value, to "0" to be in the normal monitoring mode, and then proceeds to next step SP2.

The CPU 2 at step SP2 sets the value of the detection holding counter HC, which represents the number of continuous acquisition of the inside readout DAC value in the excess detection mode, to "0", and then proceeds to next step SP3.

The CPU 2 at step SP3 acquires the readout focus DAC value from the first DAC 31 of the signal processing section 6, and then proceeds to next step SP4.

The CPU 2 at step SP4 checks whether the readout focus DAC value obtained at step SP3 is inside the normal output range or not. For example, when the readout focus DAC value is inside the normal output range like the one at time instance T4 (FIG. 4), the CPU 2 proceeds to next step SP5.

The CPU 2 at step SP5 (FIG. 5) checks whether the value of the excess detection counter OC is greater or equal to "1" or not. When the value of the excess detection counter OC is "0", then the CPU 2 is in the normal monitoring mode; therefore, the CPU 2 proceeds to next step SP6.

The CPU 2 at step SP6 checks whether the value of the excess detection counter OC meats the fail-safe action start condition (300 times). When the value of the excess detection counter OC does not meat the fail-safe action start condition, the focus actuator 21 is operating normally without danger of heat generation which leads to burnout, because the focus actuator 21 has not been exposed to a high voltage, which is outside the normal output range, for 6 seconds or more; therefore the CPU 2 returns to step SP3 to acquire next readout focus DAC value.

On the other hand, when the readout focus DAC value is outside the normal output range like the one at time instance T5 (FIG. 4), the focus actuator 21 is exposed to a high voltage; therefore the CPU 2 proceeds to next step SP11.

When obtaining the outside readout DAC value, the CPU 2 at step SP11 (FIG. 5) adds "1" to the value of the excess detection counter OC, and then proceeds to next step SP12 after switching into the excess detection mode.

The CPU 2 at step SP12 resets the detection holding counter HC to "0", and then proceeds to next step SP6.

When the value of the excess detection counter OC does not meet the fail-safe action start condition (300 times) like the one at time instance T5, the CPU 2 at step SP6 recognizes that the focus actuator 21 has not been exposed to a high voltage for a long time, and therefore returns to step SP3 to acquire next readout focus DAC value.

When the value of the excess detection counter OC is greater or equal to "1" at step SP5, the CPU 2 is in the excess detection mode; therefore, the CPU 2 proceeds to next step SP21.

The CPU 2 at step SP21 adds "1" to the value of the excess detection counter OC, and then proceeds to next step SP22. The CPU 2 at step SP22 adds "1" to the value of the detection holding counter HC, and then proceeds to next step SP23.

The CPU 2 at step SP23 checks whether the value of the detection holding counter HC meats the excess detection mode stop condition (50 times). When the value of the detection holding counter HC does not meat the excess detection mode stop condition like the one at time instance T6 (FIG. 4), there is a possibility that the focus actuator 21 has been exposed to a high voltage for some time; therefore, the CPU 2 proceeds to next step SP6.

When the value of the excess detection counter OC does not meat the fail-safe action start condition like the one at time instance T6, the CPU 2 at step SP6 (FIG. 5) recognizes that the focus actuator 21 has not been exposed to a high voltage for a long time; therefore, the CPU 2 returns to step SP3 to acquire next readout focus DAC value.

On the other hand, in the case in which the value of the detection holding counter HC meats the excess detection mode stop condition (50 times) at step SP23 like the one at time instance T7 (FIG. 4), the focus actuator 21 has not been exposed to a high voltage, which is outside the normal output range, for a long time yet; therefore, the CPU 2 proceeds to next step SP31.

The CPU 2 at step SP31 resets the value of the excess detection counter OC to "0" to return to the normal monitoring mode, and then proceeds to next step SP32. The CPU 2 at step SP32 resets the value of the detection holding counter HC to "0", and then proceeds to next step SP6.

At step SP6, when the value of the excess detection counter OC does not meet the fail-safe action start condition (300 times) like the one at time instance T7, the CPU 2 recognizes that the focus actuator 21 is operating normally, and then returns to step SP3 to acquire the readout focus DAC value.

In contrast, at step SP6, when the value of the excess detection counter OC meets the fail-safe action start condition (300 times) like the one at time instance T9 (FIG. 4) which is generated by adding values to the one at time instance T8, there is a possibility that the actuator coil of the focus actuator 21 is going to be burned out, because the focus actuator 21 has been exposed to a high voltage for a long time; therefore the CPU 2 proceeds to next step SP41.

The CPU 2 at step SP41 (FIG. 5) stops applying voltages to the actuator coil of the focus actuator 21 for one second (during the fail-safe time), and then proceeds to next step SP42. In this manner, the CPU 2 cools the actuator coil during the fail-safe time.

The CPU 2 at step SP42 resets the value of the excess detection counter OC to "0", and then proceeds to next step SP43. The CPU 2 at step SP 43 resets the value of the detection holding counter HC to "0", and then returns to step SP3 to continue this fail-safe process of actuators.

(4) Operation and Effect

The optical disc device 1 with the above configuration controls the signal processing section 6 to generate the output focus DAC value indicative of the voltage applied to the focus actuator 21, and also controls the CPU 2 to monitor the readout focus DAC value at certain intervals (i.e. monitoring the readout focus DAC value in accordance with the acquisition cycle).

The optical disc device 1 switches into the excess detection mode after detecting the outside readout DAC value, which is outside the normal output range, and then starts to count the staying time in the excess detection mode using the excess detection counter OC. After that, when the optical disc device 1 in the excess detection mode obtains the inside readout DAC value, the optical disc device 1 starts a re-detection period and starts to measure the time the detection holding counter HC does not detect the outside readout DAC value.

When the outside readout DAC value is detected again, the optical disc device 1 extends the re-detection period; whereas when the re-detection period ends after the measured time (i.e. the time the detection holding counter HC does not detect the outside readout DAC value) meats the excess detection mode stop condition, the optical disc device 1 determines that the focus actuator 21 is not exposed to a high voltage for a long time, and therefore returns to the normal monitoring mode by stopping the excess detection mode to keep monitoring the focus DAC value.

When the above re-detection period continues and the staying time of the excess detection mode meats the fail-safe action start condition, the optical disc device 1 starts fail-safe process, because there is a possibility that the actuator coil heats up due to a high voltage (outside the normal output range) applied to the focus actuator 21 for a long time. In this fail-safe process, the optical disc device 1 stops applying voltage to the focus actuator 21 during the fail-safe time to cool the actuator coil; this protects the actuator coil from heating up and being burned out.

After detecting the outside readout DAC value once, the optical disc device 1 does not stop the excess detection mode unless the re-detection period ends without detecting the outside readout DAC value again; therefore, the optical disc device 1 can certainly detect the outside readout DAC value from the output focus DAC value whose amplitude is outside the normal output range before stopping the excess detection mode. Accordingly, the optical disc device 1 can certainly detect the outside output DAC value in accordance with the acquisition cycle, which is slower than the generation cycle of the output focus DAC value by the signal processing section 6; this is not going to be a burden to the CPU 2, and also allows the CPU 2 to monitor the focus DAC value without being complex.

In addition, the optical disc device 1 that includes the excess detection counter OC performs the fail-safe process only when the staying time of the excess detection mode meats the fail-safe action start condition; therefore, the optical disc device 1 does not perform the fail-safe process when the focus actuator 21 is instantaneously exposed to a high voltage, while the optical disc device 1 performs the fail-safe process when the focus actuator 21 is exposed to a high voltage for a long time. In this manner, the optical disc device 1 prevents the actuator coil from being exposed to a high voltage for a long time and heating up; therefore, the optical disc device 1 can protect the focus actuator 21 more effectively compared to general focus actuators capable of controlling voltage.

The optical disc device 1 according to an embodiment of the present invention can protect the actuator without being complex.

(5) Other Embodiments

In the above-noted embodiments, the optical disc device 1 performs the fail-safe action process where the signal processing section 6 generates the fail-safe focus DAC value. However, the present invention is not limited to this. The CPU 2 may generate the fail-safe focus DAC value.

In addition, in the above-noted embodiments, the optical disc device 1 performs the fail-safe action process to generate the fail-safe focus DAC value equivalent to the central DAC value set to 0 V. However, the present invention is not limited to this. The fail-safe focus DAC value may be set to other voltage levels within a range capable of cooling the actuator coil.

Furthermore, in the above-noted embodiments, the optical disc device 1 performs the fail-safe action process to cool the actuator coil by applying the voltage of the central DAC value to the focus actuator 21 during the fail-safe time. However, the present invention is not limited to this. To cool the actuator coil, the optical disc device 1 may stop operating the drive control section 3 during the fail-safe time; alternatively, the optical disc device 1 may stop reproduction process during a period (equivalent to the fail-safe time) from the time when the optical disc device 1 transmits an error signal to a host machine such as personal computer until the time when the optical disc device 1 receives a reproduction process continuation command from the host machine. Accordingly, it is understood that it is desirable to have a cooling-off period for the actuator coil as fail-safe action process.

Furthermore, in the above-noted embodiments, the optical disc device 1 first detects the outside readout DAC value, which is outside the normal output range, and then starts the fail-safe process when it has been in the excess detection mode for 6 seconds (i.e. after it meats the fail-safe action start condition). However, the present invention is not limited to this. There may be various fail-safe action start conditions, for example, one of which is determined based on the detected outside readout DAC value and the number of fail-safe actions.

For example, there can be two kinds of normal output ranges: the optical disc device 1 starts fail-safe process when it has been exposed to a high voltage exceeding a first normal output range for 6 seconds; and the optical disc device 1 also starts fail-safe process when it has been exposed to a high voltage exceeding a second normal output range (larger than the first normal output range) for 3 seconds. Accordingly, the optical disc device 1 can certainly and effectively protect the actuator coil and reduce the number of fail-safe actions, because the optical disc device 1 starts fail-safe process when it has been exposed to a voltage exceeding the second normal output range (that could cause more heat) for 3 seconds; and the optical disc device 1 starts fail-safe process when it has been exposed to a voltage exceeding the first normal output range (that could cause less heat) for 6 seconds which are longer than 3 seconds.

In addition, the optical disc device 1 can change the above-noted conditions when performing the fail-safe process sequentially, such as setting a first fail-safe action start condition to 6 seconds and then setting a second fail-safe action start condition to 4 seconds which are shorter than the first fail-safe action start condition. Accordingly, heat energy increases in total because the actuator coil heats up again before it completely cools down; this allows the CPU 2 to prevent the actuator coil from being burned out, and thereby the CPU 2 can effectively protect the actuator coil.

Furthermore, in the above-noted embodiments, the optical disc device includes a drive control section 3, which is equivalent to a drive control section; and the CPU 2, which is equivalent to an indication value detection section, a mode determination section and an indication value limitation section. However, the present invention is not limited to this. The optical disc device may include other components, which are equivalent to the drive control section, the indication value detection section, the mode determination section and the indication value limitation section.

The device and method according to an embodiment of the present invention can be applied to an optical disc device capable of reproducing and recording on an optical disc, for example.

It should be understood by those skilled in the art that various modifications, combinations, sub-combinations and alterations may occur depending on design requirements and other factors insofar as they are within the scope of the appended claims or the equivalents thereof.

What is claimed is:

1. An optical disc apparatus comprising:
 a drive control section to control an actuator by generating a voltage indication value indicative of a drive voltage applied to the actuator, said actuator driving an objective lens;
 an indication value detection section to periodically detect said voltage indication value;
 a mode determination section to go into an excess detection mode when the voltage indication value is detected to be outside a predetermined tolerable range, and to start a re-detection period when the voltage indication value is detected to be inside said tolerable range, and to remain in said excess detection mode and extend the re-detection period when the voltage indication value is detected again during said re-detection period to be outside said tolerable range, and to stop said excess detection mode when the voltage indication value is not detected again during said re-detection period to be outside said tolerable range; and
 an indication value limitation section to limit said voltage indication value when staying in said excess detection mode for longer than a predetermined fail-safe action start period.

2. The optical disc apparatus according to claim 1, wherein limitation of said voltage indication value by said indication value limitation section comprises stopping application of a voltage to said drive control section for a predetermined period of time, said drive control section controlling said actuator.

3. The optical disc apparatus according to claim 2, wherein information stored in a memory section is read out while the voltage is not applied to said drive control section for the predetermined period of time.

4. A control method comprising:
periodically detecting a voltage indication value indicative of a drive voltage applied to an actuator, said actuator driving an objective lens;
going into an excess detection mode when the voltage indication value is detected to be outside a predetermined tolerable range;
starting a re-detection period when the voltage indication value is detected to be inside said tolerable range during the excess detection mode;
remaining in said excess detection mode and extending the re-detection period when the voltage indication value is detected again during said re-detection period to be outside said tolerable range, and then stopping said excess detection mode when the voltage indication value is not detected again during said re-detection period to be outside said tolerable range; and
limiting said voltage indication value when staying in said excess detection mode for longer than a predetermined fail-safe action start period.

* * * * *